US011620227B2

(12) United States Patent
Chen et al.

(10) Patent No.: US 11,620,227 B2
(45) Date of Patent: Apr. 4, 2023

(54) DATA PROCESSING METHOD, NETWORK INTERFACE CARD, AND SERVER

(71) Applicant: Huawei Technologies Co., Ltd., Shenzhen (CN)

(72) Inventors: Tianxiang Chen, Hangzhou (CN); Weibin Lin, Hangzhou (CN); Xinyu Hou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/464,093

(22) Filed: Sep. 1, 2021

(65) Prior Publication Data

US 2021/0397559 A1     Dec. 23, 2021

Related U.S. Application Data

(63) Continuation of application No. PCT/CN2019/125517, filed on Dec. 16, 2019.

(30) Foreign Application Priority Data

Mar. 1, 2019   (CN) .......................... 201910155962.7

(51) Int. Cl.
*G06F 12/00*   (2006.01)
*G06F 12/0875*   (2016.01)
(Continued)

(52) U.S. Cl.
CPC .......... *G06F 12/0875* (2013.01); *G06F 3/061* (2013.01); *G06F 3/067* (2013.01);
(Continued)

(58) Field of Classification Search
CPC .... G06F 12/0875; G06F 3/061; G06F 3/0659; G06F 3/067; G06F 13/385; G06F 2212/452; G06F 2213/0026; G06F 13/28; G06F 15/17331; G06F 12/0223; G06F 12/0877; G06F 13/4022; H04L 49/9068
USPC ....................................................... 709/250
See application file for complete search history.

(56) References Cited

U.S. PATENT DOCUMENTS 7,149,817 B2 * 12/2006 Pettey .................. H04L 69/168
                                                      709/200
7,441,006 B2   10/2008 Biran et al.
(Continued)

FOREIGN PATENT DOCUMENTS

CN        1997977 A        7/2007
CN       100476769 C       4/2009
(Continued)

OTHER PUBLICATIONS

Sungyong Seo et al.,"Design and implementation of a mobile storage leveraging the DRAM interface". 2016 IEEE International Symposium on High Performance Computer Architecture (HPCA), 12 pages.

*Primary Examiner* — Mardochee Chery
(74) *Attorney, Agent, or Firm* — Conley Rose, P.C.

(57) ABSTRACT

A data processing method comprising: After receiving an $i^{th}$ Peripheral Component Interconnect Express (PCIe) packet, a network interface card stores a $j^{th}$ instruction segment in a $j^{th}$ storage unit that is in a first storage area. When all n instruction segments of a first send queue entry (SQE) are stored in the first storage area, the network interface card obtains the first SQE, an identifier of a queue pair (QP) to which the first SQE belongs, and a location identifier of the first SQE in the QP according to the instructions in n storage units in the first storage area; the network interface card performs data processing based on the identifier of the QP to which the first SQE belongs and the location identifier of the first SQE in the QP.

20 Claims, 7 Drawing Sheets

(51) Int. Cl.
*G06F 3/06* (2006.01)
*G06F 13/38* (2006.01)
*H04L 49/90* (2022.01)

(52) U.S. Cl.
CPC .......... *G06F 3/0659* (2013.01); *G06F 13/385* (2013.01); *H04L 49/9068* (2013.01); *G06F 2212/452* (2013.01); *G06F 2213/0026* (2013.01)

(56) References Cited

U.S. PATENT DOCUMENTS

| | | | |
|---|---|---|---|
| 7,587,575 B2 * | 9/2009 | Moertl | G06F 12/1081 |
| | | | 711/6 |
| 8,478,907 B1 * | 7/2013 | Aloni | G06F 13/128 |
| | | | 719/321 |
| 10,007,443 B1 | 6/2018 | Rajadnya et al. | |
| 2005/0132017 A1 | 6/2005 | Biran et al. | |
| 2015/0317280 A1 | 11/2015 | Magro et al. | |
| 2017/0357610 A1 | 12/2017 | Thompson | |
| 2018/0067685 A1 | 3/2018 | Deng et al. | |
| 2019/0035445 A1 | 1/2019 | Huang | |
| 2019/0155760 A1 | 5/2019 | Chang | |
| 2020/0401551 A1 | 12/2020 | Joshua et al. | |

FOREIGN PATENT DOCUMENTS

| | | |
|---|---|---|
| CN | 105025070 A | 11/2015 |
| CN | 106775434 A | 5/2017 |
| CN | 107992436 A | 5/2018 |
| CN | 108885597 A | 11/2018 |
| WO | 2019033891 A1 | 2/2019 |

* cited by examiner

DATA PROCESSING METHOD, NETWORK INTERFACE CARD, AND SERVER

CROSS-REFERENCE TO RELATED APPLICATIONS

This application is a continuation of International Patent Application No. PCT/CN2019/125517, filed on Dec. 16, 2019, which claims priority to Chinese Patent application No. 201910155962.7, filed on Mar. 1, 2019. The disclosures of the aforementioned applications are hereby incorporated by reference in their entireties.

TECHNICAL FIELD

This application relates to the field of computer technologies, and in particular, to a data processing method, a network interface card (NIC), and a server.

BACKGROUND

In a remote direct memory access (RDMA) technology, a network interface card of a transmit-end server may first obtain a send queue entry (SQE) from a buffer, then obtain, from a memory, data corresponding to the SQE based on the SQE, and send the data to a receive-end server. Before the network interface card of the transmit-end server obtains the SQE, a processor of the transmit-end server first divides the SQE into a plurality of segments, and stores all segments of the SQE in the buffer. If a length of the SQE is greater than a preset threshold, the processor may notify, using a doorbell mechanism, the network interface card to process the SQE. For example, the network interface card obtains all the segments of the SQE from the buffer using a direct memory access (DMA) technology. If the length of the SQE is less than or equal to the preset threshold, an out-of-order problem may occur when the processor sends all the segments of the SQE that are stored in the buffer to the network interface card.

To resolve the out-of-order problem in a conventional technology, in a process of obtaining the plurality of segments by the processor through division, based on a block order, each time an instruction segment is obtained, the instruction segment is delivered to the buffer in the processor, and then the instruction segment is sent to the network interface card using a Peripheral Component Interconnect Express (PCIe) packet. The processor then sends a PCIe barrier instruction to the buffer, to clear the instruction segment that is in the buffer and that has been sent to the network interface card. By analog, the processor delivers a next instruction segment to the buffer based on the order. Therefore, an order of the instruction segments of the SQE is ensured using a PCIe barrier function. In the foregoing method, the out-of-order problem of all the segments of the SQE is overcome, but PCIe bandwidth is wasted. In addition, in the foregoing processing process, the processor needs to wait until a previous instruction segment is successfully sent to the network interface card, and then clears the buffer using the barrier function. An entire data transmission process is serial. In this case, a speed of data transmission between the processor and the network interface card is reduced. Consequently, a processing delay in the entire data processing process is increased, and data processing efficiency of a system is affected.

SUMMARY

This application provides a data processing method, a network interface card, and a server, to resolve a problem of low data processing efficiency of a system and a high delay, caused by a technical method in a conventional SQE order preserving processing process.

According to a first aspect, this application provides a data processing method. The method may be applied to a network interface card, or the method may be applied to a communications apparatus that supports the network interface card in implementing the method. For example, the communications apparatus includes a chip system. The method may include: receiving an $i^{th}$ PCIe packet; and storing, in a $j^{th}$ storage unit in a first storage area, a $j^{th}$ instruction segment contained by the $i^{th}$ PCIe packet. A first SQE is divided into n segments based on a preset size, where n is an integer, and n is greater than or equal to 1. The $i^{th}$ PCIe packet further includes a first address segment, and the first address segment is used to indicate a segment location of the $j^{th}$ instruction segment in the first SQE, where i is an integer, and j is an integer. The first storage area is a storage area, in the network interface card, used to store the first SQE. The first storage area includes m storage units, and each storage unit is configured to store one instruction segment of the first SQE, where m is an integer, and n≤m. In the technical solution, an order preserving operation of the plurality of instruction segments of the first SQE is completely offloaded to the network interface card of a transmit-end server for completion, and a processor of the transmit-end server does not need to perform the order preserving operation of the plurality of instruction segments of the first SQE, and may deliver the plurality of instruction segments of the first SQE at a time. In this way, utilization of PCIe bandwidth is improved, a running speed of the processor is increased, a delay in a data processing process is reduced, and data transmission efficiency of an entire communications system is improved.

Further, when all the n instruction segments of the first SQE are stored in the first storage area, the first SQE, an identifier of a queue pair (QP) to which the first SQE belongs, and an identifier of a location of the first SQE in the QP may be obtained according to the instructions in n storage units in the first storage area. Additionally, and data processing is performed based on the identifier of the QP to which the first SQE belongs and the identifier of the location of the first SQE in the QP.

In a possible implementation, when i=1, before the network interface card stores, in the $j^{th}$ storage unit in the first storage area, the $j^{th}$ instruction segment, the method may further include: determining whether the first address segment is an address in an address range of storage space in which the first storage area is located; if the first address segment is the address in the address range of the storage space in which the first storage area is located, determining that the $j^{th}$ instruction segment is data of a blueframe, and storing, in the $j^{th}$ storage unit that is in the first storage area, the $j^{th}$ instruction segment contained by the first PCIe packet; or if the first address segment is not the address in the address range of the storage space in which the first storage area is located, determining that the $j^{th}$ instruction segment is not data of a blueframe, and obtaining the first SQE based on a non-blueframe method.

In a possible implementation, when j=1, before the network interface card stores, in the $j^{th}$ storage unit in the first storage area, the $j^{th}$ instruction segment, the method may further include: obtaining a total length, of the first SQE, contained by the first instruction segment; comparing the total length of the first SQE with a preset threshold; if the total length of the first SQE is less than or equal to the preset threshold, determining that the first instruction segment of the first SQE is data of a blueframe, and storing, in the first storage unit in the first storage area, the first instruction segment contained by the first PCIe packet; or if the total length of the first SQE is greater than the preset threshold, determining that the first instruction segment of the first SQE is not data of a blueframe, and obtaining the first SQE based on a non-blueframe method.

In a possible implementation, after the $j^{th}$ instruction segment is stored in the $j^{th}$ storage unit in the first storage area, the method may further include: determining whether the first SQE is completely received; if the first SQE is completely received, generating a terminator; or if the first SQE is not completely received, continuing receiving.

For example, an $(i+1)^{th}$ PCIe packet is received, and a $k^{th}$ instruction segment included in the $(i+1)^{th}$ PCIe packet is stored in a $k^{th}$ storage unit in the first storage area. The $(i+1)^{th}$ PCIe packet further includes a second address segment. The second address segment is used to indicate a segment location of the $k^{th}$ instruction segment in the first SQE. The $k^{th}$ instruction segment is any one of instruction segments of the first SQE other than a received instruction segment of the first SQE, where k is an integer.

Optionally, the determining whether the first SQE is completely received includes: determining whether an accumulated value is equal to the total length of the first SQE; if the accumulated value is equal to the total length of the first SQE, determining that the first SQE is completely received; or if the accumulated value is not equal to the total length of the first SQE, determining that the first SQE is not completely received. The accumulated value is used to indicate a length of the received instruction segment of the first SQE, and an initial value of the accumulated value may be 0.

In a possible implementation, the performing, by the network interface card, data processing based on the identifier of the QP to which the first SQE belongs and the identifier of the location of the first SQE in the QP includes: determining, based on the identifier of the QP to which the first SQE belongs and the identifier of the location of the first SQE in the QP, the first storage area for storing the first SQE; sequentially reading the n instruction segments of the first SQE by starting from a start address of the first storage area; and obtaining and sending, according to the n instruction segments of the first SQE, data corresponding to the first SQE.

In a possible implementation, if the total length of the first SQE is less than or equal to the preset threshold, the method may further include: obtaining the identifier of the QP to which the first SQE belongs and the identifier of the location of the first SQE in the QP that are contained by the first instruction segment; and establishing a correspondence between an identifier of the first storage area, the identifier of the QP to which the first SQE belongs, and the identifier of the location of the first SQE in the QP. As such, when all the n instruction segments of the first SQE are stored in the first storage area, the first SQE is obtained based on the correspondence between the identifier of the first storage area, the identifier of the QP to which the first SQE belongs, and the identifier of the location of the first SQE in the QP.

In a possible implementation, when i=1, that is, after the first PCIe packet is received, the method may further include allocating the first storage area to the first SQE.

Any one of the first aspect or the possible implementations of the first aspect may be executed by the network interface card of the transmit-end server, where the transmit-end server is a server configured to send data. A server is referred to as a transmit-end server when the server is configured to send data, and the server is referred to as a receive-end server when the server is configured to receive data.

According to a second aspect, this application provides a data processing apparatus. The apparatus includes modules configured to perform the data processing method according to any one of the first aspect or the possible implementations of the first aspect.

According to a third aspect, this application provides a network interface card, including a memory and a processor. The memory is configured to store computer-executable instructions. When the network interface card runs, the processor executes the computer-executable instructions in the memory, to perform the operation steps of the method according to any one of the first aspect or the possible implementations of the first aspect using a hardware resource in a data processing apparatus.

According to a fourth aspect, this application further provides a computer-readable storage medium. The computer-readable storage medium stores a computer program. When the computer program is run on a computer, the computer is enabled to perform the operation steps of the method according to any one of the first aspect or the possible implementations of the first aspect.

According to a fifth aspect, this application further provides a computer program product. When the computer program product runs on a computer, the operation steps of the method according to any one of the first aspect or the possible implementations of the first aspect are performed.

It may be understood that any one of the apparatus, the computer-readable storage medium, the computer program product, or the like provided above is configured to perform the corresponding method provided above. Therefore, for beneficial effects that can be achieved by the any one of the apparatus, the computer-readable storage medium, the computer program product, or the like, refer to beneficial effects in the corresponding method. Details are not described herein again.

DESCRIPTION OF EMBODIMENTS

Figure 1:
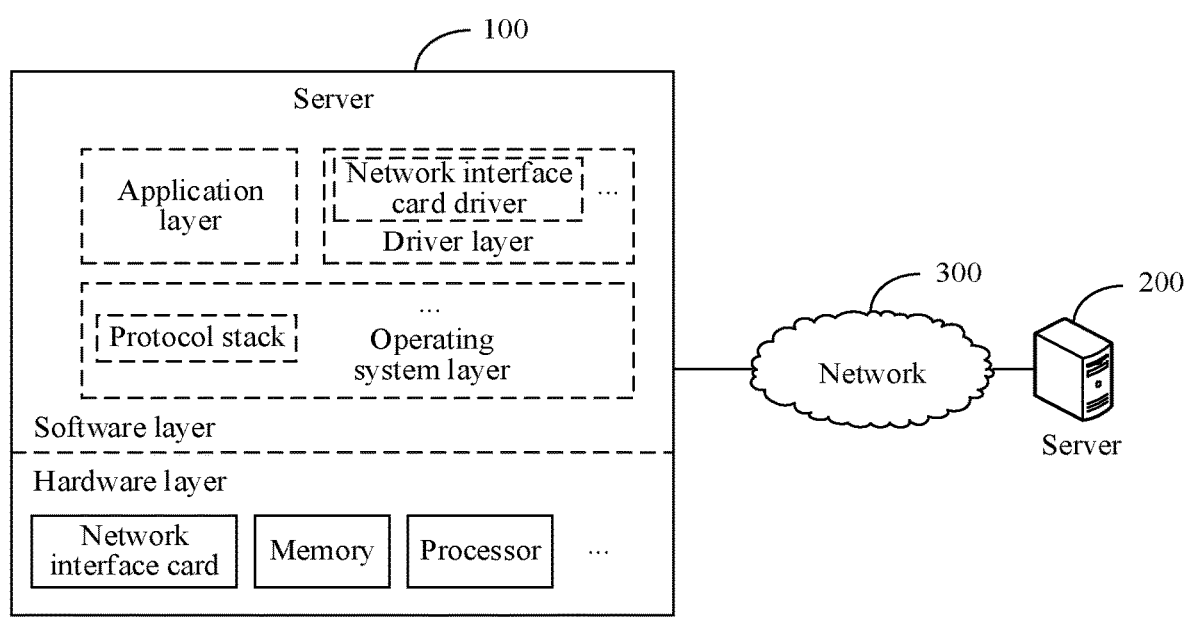
FIG. 1 is a schematic structural diagram of a communications system according to this application.

FIG. 1 is an example structural diagram of a communications system according to this application. As shown in FIG. 1, the communications system includes a server 100 and a server 200. Message communication may be performed between the server 100 and the server 200 through a network 300. A server that sends data may be referred to as a transmit-end server, and a server that receives data may be referred to as a receive-end server. A server may be referred to as a transmit-end server when the server is configured to send data, and the server may be referred to as a receive-end server when the server is configured to receive data. The network 300 may be Ethernet, that is, servers may communicate with each other using a transmission control protocol/internet protocol (TCP/IP). The network 300 may alternatively be a network based on a remote direct memory access technology. The remote direct memory access technology is developed to resolve a delay problem in data processing by a server in a network. The server may quickly move data from a system to a remote system memory using a network interface card of the server based on the remote direct memory access technology, without involving a processor of the server. In this way, load of the processor of the server is reduced, and data transmission efficiency between the servers is improved. For example, the network based on the remote direct memory access technology may be an InfiniBand (IB) network, a remote direct memory access over converged Ethernet (RoCE) network, or an iWapp network. This is not limited in this application.

Each of the server 100 and the server 200 includes a hardware layer and a software layer. FIG. 1 shows only a structure of the server 100. A hardware layer of the server 100 includes a network interface card, a memory, and a processor. The processor may be a central processing unit (CPU), the processor may further be another general purpose processor, a digital signal processor (DSP), an application-specific integrated circuit (ASIC), a field-programmable gate array (FPGA) or another programmable logical device, a discrete gate or transistor logic device, or a discrete hardware component. The general purpose processor may be a microprocessor, any conventional processor, or the like.

It should be noted that in FIG. 1, only an example in which there is one network interface card, one memory, and one processor at the hardware layer of the server are 1 is used. Quantities of network interface cards, memories, and processors in a same server are not limited in the embodiments of this application.

The network interface card may be a network interface card that supports the RDMA technology, or may be a host channel adapter (HCA). A main function of the network interface card is to connect a plurality of servers to a network, such that the servers can communicate with each other through a network that supports the RDMA technology. The network interface card may be connected to the network through an external optical fiber, a cable, or the like. The network interface card may be inserted into a PCIe slot of a computer, and is connected to the server through PCIe. Alternatively, the network interface card may be connected to the server through a specific (or private) bus. This is not limited in the embodiments of this application. It may be understood that in physical implementation, the network interface card may be used as a part of the server, or may be a component/device independent of the server. For ease of description, the network interface card is described as a network interface card of the server below. The network interface card may include one or more ports. The port is configured to receive data. The network interface card may include a processor, a buffer, a memory, and a register. The memory or the buffer in the network interface card may be implemented using a random access memory (RAM) type storage medium.

The software layer is program code that runs at the hardware layer. For example, the software layer may be further divided into several layers, and the layers communicate with each other through a software interface. The software layer includes an application layer, a driver layer, and an operating system layer. The application layer includes a series of program code for running an application program. The driver layer is configured to implement message exchange between the hardware layer and the software layer. The driver layer includes a network interface card driver and the like. The operating system layer includes operating system program code and a protocol stack. An operating system may be Linux, Windows, vxWarks, or the like. The protocol stack is a set of program code that is classified based on different layers involved in a communications protocol and that is used for processing data at a corresponding layer.

In a possible implementation, for example, in an IB network architecture, the protocol stack may include an application layer, a transport layer, a network layer, a link layer, and a physical layer. A function of the application layer may be implemented at the software layer. Functions of the transport layer, the network layer, the link layer, and the physical layer may be implemented in the network interface card.

To better understand the technical solutions provided in the embodiments of this application, the following briefly describes terms and technical concepts in the embodiments of this application.

Before a server transmits data, a plurality of queue pairs (QPs) may be preconfigured for the server. Each QP may include a send queue (SQ) and a receive queue (RQ). Each SQ is used to store at least one SQE. Each RQ is used to store at least one receive queue entry (RQE). The SQE and the RQE may be collectively referred to as a work queue entry (WQE).

It may be understood that the SQE is instruction information required by a network interface card of the server to obtain data from a memory. The RQE is instruction information required by the server to store data after receiving the data.

It may be further understood that each SQE and RQE are used only to transmit instruction information, which does not include data. Therefore, a receive-end server or a transmit-end server needs to obtain data from another storage medium (for example, a memory) based on the instruction information in the SQE or the RQE.

The receive-end server and the transmit-end server communicate with each other based on the QP. Each server includes one or more QPs. Different servers may include a same quantity or different quantities of QPs. The communications system in FIG. 1 is used as an example. When the server 100 serves as a transmit-end server and the server 200 serves as a receive-end server, a QP 11 is established in the server 100, and the QP 11 includes an SQ 11 and an RQ 11; and a QP 21 is established in the server 200, and the QP 21 includes an SQ 21 and an RQ 21. In a process of communication between the server 100 and the server 200, a correspondence between the QP 11 and the QP 21 is pre-established. Correspondingly, the transmit-end server may obtain data from the memory based on an SQE in the SQ 11, and the receive-end server may store the received data based on an RQE in the RQ 21.

It should be noted that names of the two QPs predetermined respectively by the receive-end server and the transmit-end server for communication and names of the SQs and RQs in the QPs may be the same or different. This is not limited in this application. It should be further noted that different quantities of QPs may be configured for different receive-end servers, and a QP configured for each receive-end server may include a different quantity of SQEs and RQEs.

A complete queue (CQ) may be further configured for the server. The CQ is used to store a complete queue entry (CQE). After the network interface card of the server reads complete data from the memory or writes complete data into the memory, the network interface card may send the CQE to a processor.

It should be noted that the processor of the server is usually connected to the network interface card of the server through a PCIe bus. Due to a limitation of a PCIe protocol, a memory write limitation is caused, that is, the processor of the server delivers a maximum of 8-byte data to the network interface card each time. A length of each SQE is at least 64 bytes, and the length of the SQE may vary with a service. If the length of the SQE is relatively large, when the processor of the server directly delivers the SQE to the network interface card of the server, transmission efficiency is reduced, and a usage ratio of the processor is increased. Therefore, the processor of the server may indicate, by ringing a doorbell, the network interface card of the server to move a large data block using a direct memory access technology. Based on PCIe attribute limitations of the processor of the server and the network interface card of the server, for example, the processor of the server is limited by a memory attribute register, a granularity of the large data block may be 4 K. The granularity of the large data block may refer to a maximum read value and a maximum write value.

In some possible embodiments, the length of the SQE is relatively small, and if the network interface card still reads the SQE from the memory using the direct memory access technology, a data transmission delay is increased. Therefore, when the length of the SQE is less than or equal to a preset threshold, the processor of the transmit-end server may directly deliver the SQE to the network interface card of the transmit-end server in a form of an instruction segment. In this application, an SQE whose length is less than or equal to the preset threshold may be referred to as a blueframe. However, when the processor of the transmit-end server sends all segments of the blueframe to the network interface card, an out-of-order problem may occur. In a conventional technology, the out-of-order problem of all the segments of the blueframe can be overcome, but PCIe bandwidth is wasted. In addition, a speed at which the processor of the transmit-end server sends the blueframe to the network interface card of the transmit-end server is reduced, a processing delay in an entire data processing process is increased, and data processing efficiency of a system is affected.

According to a data processing method provided in this application, an order preserving operation of a plurality of instruction segments of a blueframe may be completely offloaded to a network interface card of a transmit-end server for completion, a processor of the transmit-end server does not need to perform the order preserving operation of the plurality of instruction segments of the blueframe, and the processor of the transmit-end server may deliver the plurality of instruction segments of the blueframe at a time provided that it is ensured that different blueframes are isolated using a PCIe barrier. Therefore, a plurality of instruction segments of a same blueframe can be continuously delivered, thereby effectively reducing a quantity of packets between the processor and the network interface card, and improving utilization of PCIe bandwidth. In addition, the processor may send a plurality of instruction segments in parallel, that is, the processor may simultaneously process instruction segments of different SQEs and different instruction segments of a same SQE, without a need to focus on an order preserving problem of instruction segments of each SQE. In this way, load of the processor is reduced, a data processing delay between the processor and the network interface card is reduced, and data processing efficiency is improved.

With reference to the accompanying drawings, the following then describes in detail the data processing method provided in the embodiments of this application.

Figure 2:
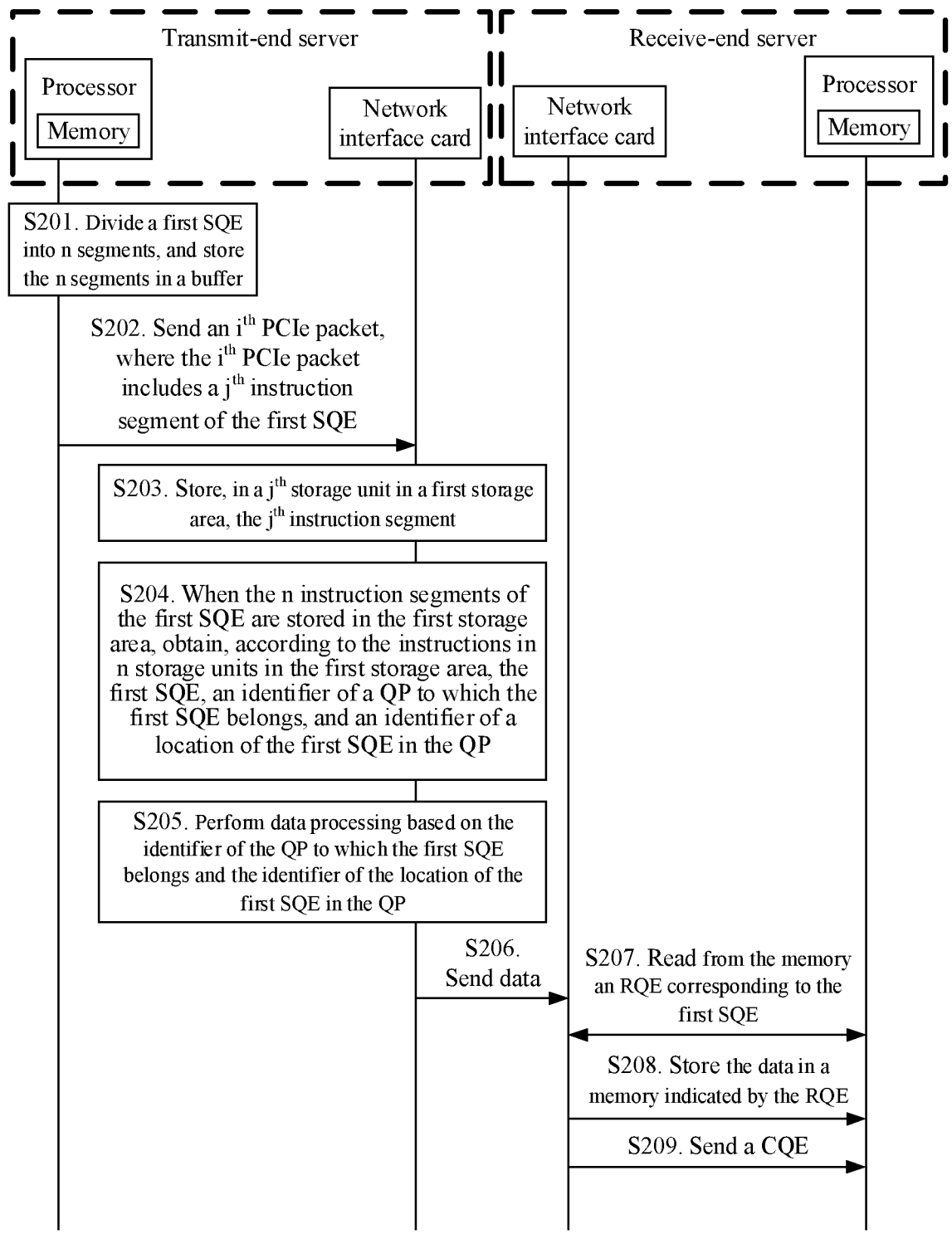
FIG. 2 is a flowchart of a data processing method according to this application.

FIG. 2 is a flowchart of a data processing method according to an embodiment of this application. The method shown in FIG. 2 may be performed by a network interface card of a transmit-end server. In this embodiment of this application, order preserving processing may be performed for each SQE of the network interface card of the transmit-end server, and a same method is used for performing order preserving processing for instruction segments of all the SQEs. For ease of description, a $j^{th}$ instruction segment of an SQE is used as an example for description. As shown in the figure, the method includes the following steps.

S201: A processor of the transmit-end server divides a first SQE into n segments, and stores the n segments in a buffer.

The processor of the transmit-end server may first divide the first SQE into n instruction segments, and store the n instruction segments of the first SQE in the buffer, where n is an integer, and n is greater than or equal to 1. For example, it is assumed that each instruction segment may be 8 bytes. If a length of the SQE is 64 bytes, the processor of the transmit-end server may first divide the SQE into eight instruction segments, in other words, n=8. If the length of the SQE is 256 bytes, the processor of the transmit-end server may first divide the SQE into 32 instruction segments, in other words, n=32. The buffer may be a buffer in the processor of the transmit-end server. For ease of description, an example in which the length of the first SQE is 64 bytes, and the first SQE is divided into eight segments is used for description below.

S202: The processor of the transmit-end server sends an $i^{th}$ PCIe packet to the network interface card of the transmit-end server, where the $i^{th}$ PCIe packet includes a $j^{th}$ instruction segment of the first SQE.

The $i^{th}$ PCIe packet may further include a first address segment, and the first address segment is used to indicate a segment location of the $j^{th}$ instruction segment in the first SQE, where i is an integer, j is an integer, and i and j may be or may not be equal. For example, if n=8, i may range from 1 to 8, and j may range from 1 to 8.

S203: The network interface card of the transmit-end server stores, in a $j^{th}$ storage unit in a first storage area, the $j^{th}$ instruction segment.

Before the network interface card of the transmit-end server receives an instruction segment of a blueframe, a buffer area used to store the blueframe may be preconfigured in the network interface card. A blueframe buffer may be implemented using a storage area of a RAM, and certainly may be implemented using another storage medium. This is not limited in this application. For ease of description, in the following embodiments of this application, an example in which a function of the blueframe buffer is implemented using a storage area of a memory is used for further description.

The buffer area of the blueframe may be divided based on a preset rule. For example, the buffer area of the blueframe may be divided into a plurality of storage areas based on a preset threshold. A storage capacity of each storage area is greater than or equal to the preset threshold. Each storage area may be divided into a plurality of storage units based on a preset size of an instruction segment. The storage capacity of each storage unit is greater than or equal to the preset size of the instruction segment, and one storage unit may sequentially store one or more instruction segments. The preset threshold may be 256 bytes, and certainly may be another value. This is not limited in this application. For ease of description, in the following embodiments of this application, an example in which one storage unit is configured to store one instruction segment is used for description.

Figure 3:
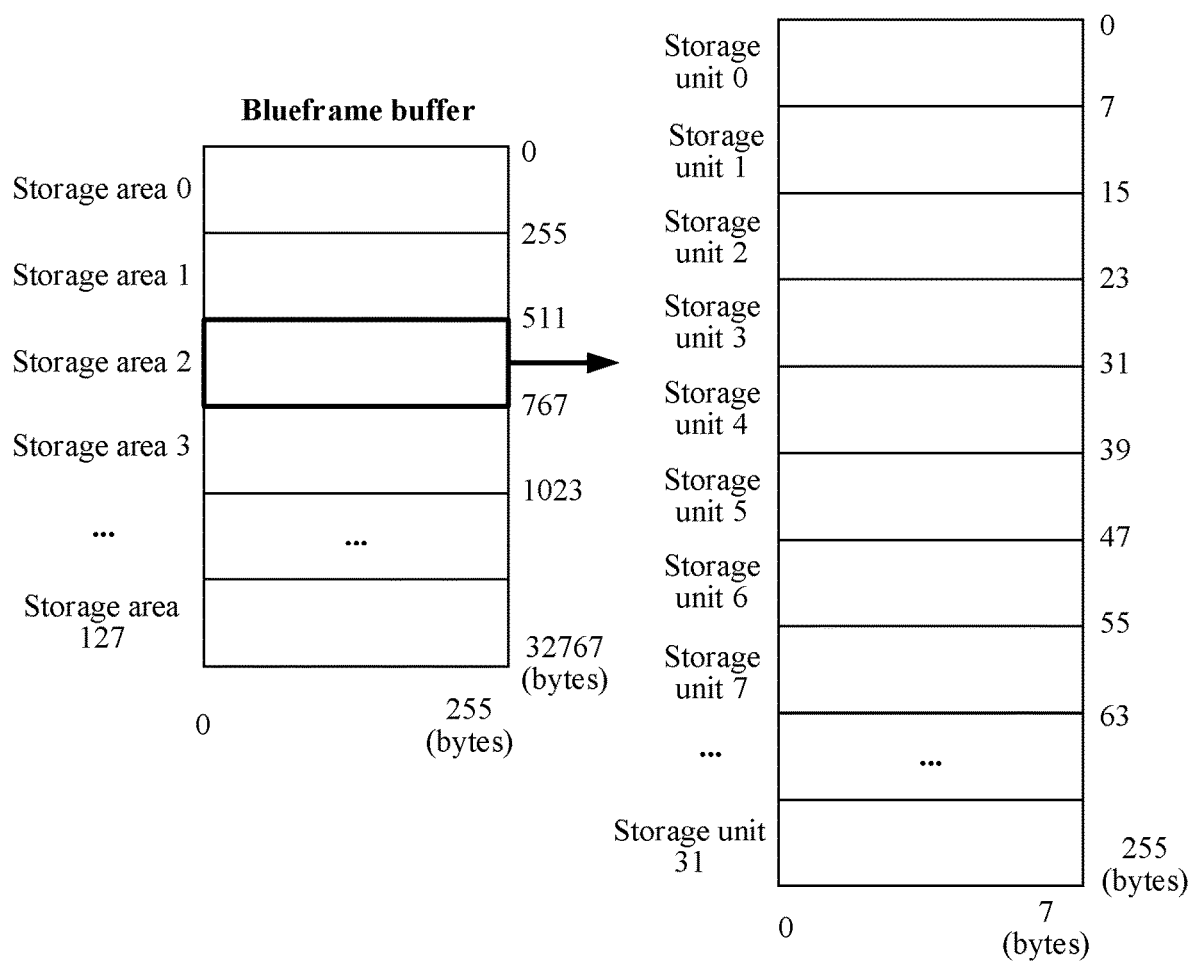
FIG. 3 is a schematic structural diagram of a blueframe buffer according to this application.

As shown in FIG. 3, the blueframe buffer may include 128 storage areas. If the preset threshold is 256 bytes, a storage capacity of each of the 128 storage areas may be 256 bytes. It is assumed that the preset size of the instruction segment is 8 bytes, and each storage area may include 32 storage units. In this case, a storage capacity of each of the 32 storage units may be 8 bytes. For ease of description, the 128 storage areas may be numbered using 0 to 127. For example, a first storage area is numbered 0, a second storage area is numbered 1, and by analogy, a $128^{th}$ storage area is numbered 127. Similarly, the 32 storage units may be numbered using 0 to 31. For example, a first storage unit is numbered 0, a second storage unit is numbered 1, and by analogy, a $32^{nd}$ storage unit is numbered 31.

The first storage area may be any idle storage area in the blueframe buffer. The first storage area includes a plurality of storage units. In addition, each storage unit carries a unique identifier, and the identifier is associated with a ranking of each to-be-stored segment of an SQE. For example, an SQE 1 is sequentially divided into three instruction segments: an instruction 1, an instruction 2, and an instruction 3. A storage area 1 is used to store all the instruction segments of the SQE 1, and includes three storage units: a storage unit 1, a storage unit 2, and a storage unit 3. The storage unit 1 is configured to store the instruction 1, the storage unit 2 is configured to store the instruction 2, and the storage unit 3 is configured to store the instruction 3.

After receiving the $i^{th}$ PCIe packet sent by the processor of the transmit-end server, the network interface card of the transmit-end server parses the $i^{th}$ PCIe packet to obtain the $j^{th}$ instruction segment and the first address segment. The network interface card of the transmit-end server may determine the segment location of the $j^{th}$ instruction segment in the first SQE, namely, a ranking of the instruction segment in the first SQE, based on the first address segment, and store the $j^{th}$ instruction segment in the $j^{th}$ storage unit in the first storage area. For example, when j=1, the first instruction segment is stored in the first storage unit in the first storage area. When j=2, the second instruction segment is stored in the second storage unit in the first storage area. When j=3, the third instruction segment is stored in the third storage unit in the first storage area. When j=4, the fourth instruction segment is stored in the fourth storage unit in the first storage area. When j=5, the fifth instruction segment is stored in the fifth storage unit in the first storage area. When j=6, the sixth instruction segment is stored in the sixth storage unit in the first storage area. When j=7, the seventh instruction segment is stored in the seventh storage unit in the first storage area. When j=8, the eighth instruction segment is stored in the eighth storage unit in the first storage area.

S204: When the n instruction segments of the first SQE are stored in the first storage area, the network interface card of the transmit-end server obtains the first SQE, an identifier of a QP to which the first SQE belongs, and an identifier of a location of the first SQE in the QP according to the instructions in n storage units in the first storage area.

After all the n instruction segments of the first SQE are stored in the first storage area, the network interface card of the transmit-end server may generate an acknowledgement (ACK). After the network interface card of the transmit-end server schedules the QP to which the first SQE belongs, the network interface card of the transmit-end server may determine, based on the identifier of the QP to which the first SQE belongs and the identifier of the location of the first SQE in the QP, the first storage area for storing the first SQE, and sequentially read the n instruction segments of the first SQE by starting from a start address of the first storage area.

Optionally, the network interface card of the transmit-end server may determine, based on a correspondence between an identifier of the first storage area, the identifier of the QP to which the first SQE belongs, and the identifier of the location of the first SQE in the QP, the first storage area for storing the first SQE. For example, a table corresponding to the blueframe buffer is queried based on the identifier of the QP to which the first SQE belongs and the identifier of the location of the first SQE in the QP, to obtain the identifier of the first storage area. After an address of the first storage area is determined based on the identifier of the first storage area, instruction segments are sequentially and directly extracted from the first storage area for processing.

For example, the network interface card of the transmit-end server may preconfigure a table. The table is used to record an identifier of the storage area in the blueframe buffer and information related to a stored blueframe, for example, a correspondence between the identifier of the storage area, an identifier of a QP to which an SQE belongs, and an identifier of a location of the SQE in the QP. The identifier of the first storage area may be a number of the storage area or the start address of the storage area. The table may include a logical internal register, and an idle storage area and an occupied storage area are stored. An address of the storage area may further be read based on the identifier of the storage area, a match or a mismatch is returned based on the identifier of the storage area, and so on. Table 1 is an example provided in this application. The table includes the identifier of the storage area, the identifier of the QP to which the SQE belongs, and the location of the SQE in the QP.

TABLE 1

| Identifier of the storage area | Identifier of the QP to which the SQE belongs | Location of the SQE in the QP |
|---|---|---|
| 0 | queue pair number 1 (qpn1) | Pointer (PI) |
| 1 | qpn2 | PI |
| 2 | qpn3 | PI |
| 3 | qpn4 | PI |
| ... | ... | ... |
| 127 | | |

When needing to write the instruction segment into the storage area in the blueframe buffer, the network interface card of the transmit-end server may first query the table to obtain an idle storage area. The idle storage area may be a storage area in which no correspondence between the identifier of the storage area, the identifier of the QP to which the SQE belongs, and the identifier of the location of the SQE in the QP is established. If finding an idle storage area, the network interface card of the transmit-end server obtains an address of the idle storage area, and stores, in the $j^{th}$ storage unit in the idle storage area, the $j^{th}$ instruction segment of the first SQE.

In a possible embodiment, if the network interface card of the transmit-end server does not find an idle storage area, it indicates that the blueframe buffer is fully occupied. In this case, the blueframe is discarded, and is processed as an ordinary doorbell. That is, the network interface card of the transmit-end server needs to obtain another instruction segment of the SQE from the buffer using a direct memory access technology. In addition, another storage area in which data has been stored may be or may not be fully occupied. This is not limited in this embodiment of this application. In this embodiment of this application, the first storage area allocated by the network interface card of the transmit-end server is a storage area in which no data is stored.

S205: The network interface card of the transmit-end server performs data processing based on the identifier of the QP to which the first SQE belongs and the identifier of the location of the first SQE in the QP.

The network interface card of the transmit-end server reads data corresponding to the first SQE from a memory of the transmit-end server based on the first SQE, and sends the data to a receive-end server, in other words, performs S206 to S209.

In a possible implementation, when there is a relatively small amount of data that needs to be sent, the data that needs to be sent may be directly placed in an SQE. The processor of the transmit-end server directly delivers the SQE that includes the data to the network interface card of the transmit-end server in a form of an instruction segment, and the network interface card of the transmit-end server does not need to read the data from the memory of the transmit-end server. This further reduces a data transmission delay. In this embodiment of this application, the data in the SQE may be referred to as inline data. If the first SQE includes data, the network interface card of the transmit-end server does not need to read the data from the memory of the transmit-end server, and directly sends the data contained by the first SQE to the receive-end server after reading the first SQE from the blueframe buffer.

S206: The network interface card of the transmit-end server sends the data to a network interface card of the receive-end server.

S207: The network interface card of the receive-end server reads an RQE corresponding to the first SQE from a memory of the receive-end server.

After receiving the data sent by the network interface card of the transmit-end server, the network interface card of the receive-end server may first store the data in a buffer, and then the network interface card of the receive-end server reads the RQE corresponding to the QP to which the first SQE belongs from the memory of the receive-end server.

After receiving the data, the network interface card of the receive-end server may read a qp number in a data header, and then read information (which may also be referred to as qp context) about a corresponding QP based on the qp number, obtain an address and a pointer of an RQ based on the information about the QP, and then read the RQE from a memory of a processor. The information about the QP may be stored in the memory of the processor or in the buffer of the network interface card of the receive-end server.

S208: The network interface card of the receive-end server stores the data in a memory indicated by the RQE.

S209: The network interface card of the receive-end server sends a CQE to the processor of the receive-end server.

For implementations of S206 to S209, refer to other approaches. Details are not described in this application.

In a possible embodiment, there may be a plurality of to-be-processed SQEs in the transmit-end server. The foregoing operation process may be used for a data processing process of each SQE. A partition identifier may be added to a last segment of each SQE. The partition identifier is used to mark the last segment of the SQE, and is used by the network interface card to identify a last segment of a different SQE. In addition, segments of the plurality of SQEs may be processed in parallel, and only an identifier of an SQE to which each segment belongs needs to be added to the segment. In this case, the network interface card may identify a corresponding storage area based on the identifier, and store the segment in a corresponding storage unit, to further improve data processing efficiency of a system.

According to the data processing method provided in this embodiment of this application, the network interface card of the transmit-end server performs order preserving processing on an out-of-order instruction segment of a blueframe using an address of a PCIe packet, and directly stores, in a corresponding storage unit in the blueframe buffer, the instruction segment. In this way, the processor of the transmit-end server does not need to focus on an order preserving problem of each segment, and the network interface card of the transmit-end server implements order preserving processing of the instruction segment using an idle storage area. This reduces a processing process and load of the transmit-end server. In addition, the processor of the transmit-end server may simultaneously send a plurality of instruction segments of different SQEs or different instruction segments of a same SQE to the network interface card. This improves data processing efficiency. Furthermore, in a process of sending a plurality of instruction segments of a same SQE, the segments do not need to be isolated using a barrier function in other approaches. This reduces a quantity of PCIe packets.

Figure 4:
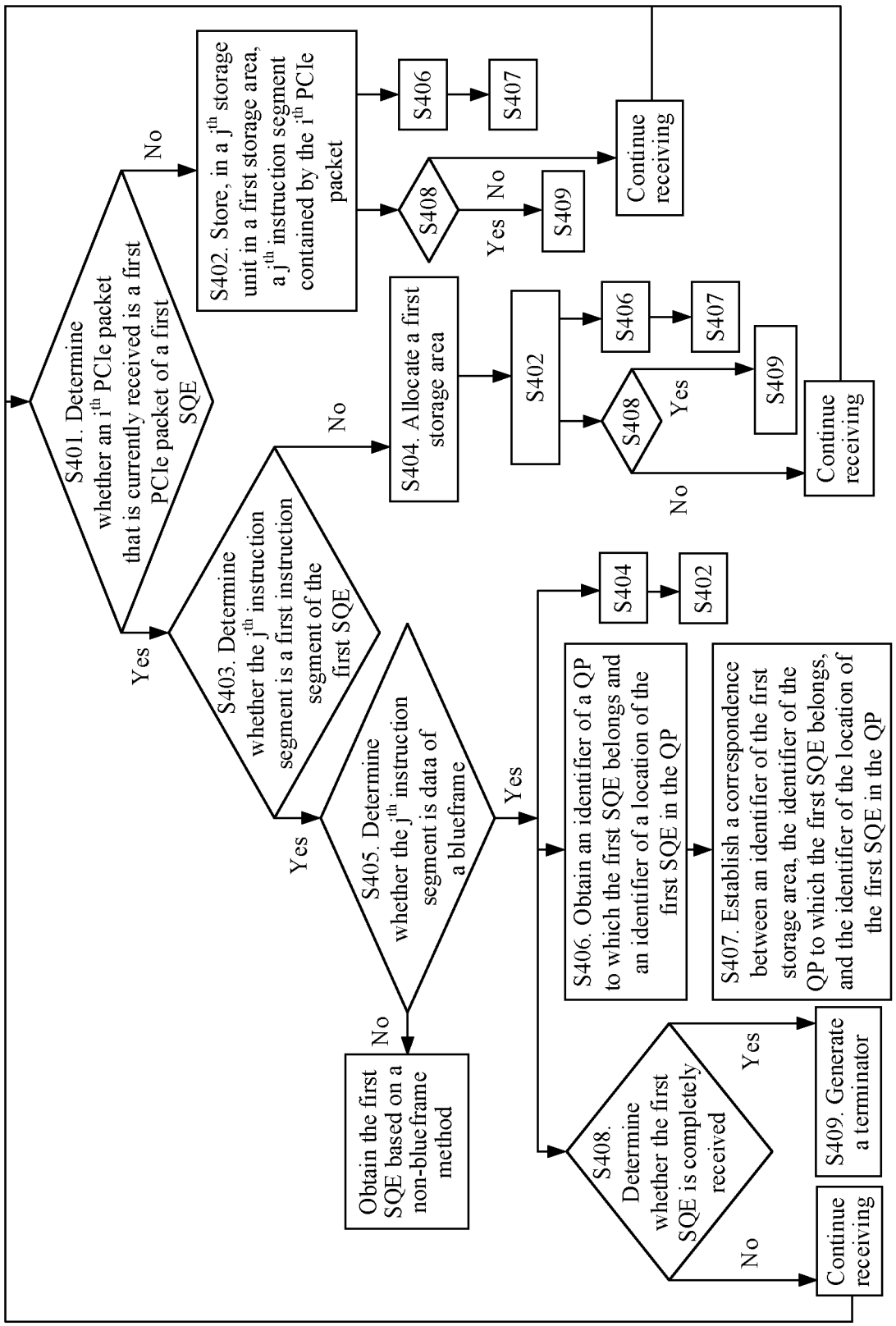
FIG. 4 is a flowchart of another data processing method according to this application.

Then, the following further describes the data processing method provided in the embodiments of this application with reference to FIG. 4. The method includes the following steps.

S401: A network interface card of a transmit-end server determines whether a currently received $i^{th}$ PCIe packet is a first PCIe packet of a first SQE.

If determining that the currently received $i^{th}$ PCIe packet is not the first PCIe packet of the first SQE, in other words, i is not equal to 1, the network interface card of the transmit-end server performs S402.

If determining that the currently received $i^{th}$ PCIe packet is the first PCIe packet of the first SQE, in other words, i=1, the network interface card of the transmit-end server performs S403.

S402: The network interface card of the transmit-end server stores, in a $j^{th}$ storage unit in a first storage area, a $j^{th}$ instruction segment contained by the $i^{th}$ PCIe packet.

For an explanation, refer to the description in S203. Details are not described in this application.

S403: The network interface card of the transmit-end server determines whether a $j^{th}$ instruction segment is a first instruction segment of the first SQE.

In some embodiments, the network interface card of the transmit-end server may determine whether all lower 8 bits of a first address segment are 0. If all the lower 8 bits of the first address segment are 0, it may be determined that the $j^{th}$ instruction segment is the first instruction segment of the first SQE. If all the lower 8 bits of the first address segment are not 0, the $j^{th}$ instruction segment is not the first instruction segment of the first SQE, in other words, the $j^{th}$ instruction segment is any one of a second instruction segment to an eighth instruction segment of the first SQE.

It should be noted that only when the first SQE is a blueframe, a processor of the transmit-end server sends an instruction segment other than the first instruction segment of the first SQE to the network interface card of the transmit-end server. Therefore, the network interface card of the transmit-end server may further determine that the first SQE is a blueframe, and the $j^{th}$ instruction segment is data of the blueframe.

If determining that the $j^{th}$ instruction segment is not the first instruction segment of the first SQE, in other words, j is not equal to 1, the network interface card of the transmit-end server performs S404 and S402.

If determining that the $j^{th}$ instruction segment is the first instruction segment of the first SQE, in other words, j=1, the network interface card of the transmit-end server performs S405.

S404: The network interface card of the transmit-end server allocates a first storage area.

Optionally, the network interface card of the transmit-end server may record a number of the first storage area, such that after receiving a new PCIe packet, the network interface card of the transmit-end server stores another instruction segment of the first SQE in the first storage area.

S405: The network interface card of the transmit-end server determines whether the $j^{th}$ instruction segment is data of a blueframe.

The first instruction segment may be content of the first 8 bytes of the first SQE. The first instruction segment may include the following content: operation code, sqe_index, an operation code mode, DS, a qp number, and sl.

(1) The operation code (opcode) indicates a type of a transmission instruction. For example, the operation code may include send, RDMA write, send first, and sendonly, where send first indicates that the instruction sent is a first segment of an SQE, and sendonly indicates that the instruction sent is an SQE.

(2) The parameter sqe_index indicates a location of the SQE generated by software in a queue, namely, a pointer (PI).

(3) The operation code mode (opc_mod), for example, may indicate, in an atomic operation, how to process data, for example, add/or, or/and.

(4) The parameter DS indicates a total length of the corresponding SQE.

(5) The qp number indicates a number of a QP in which the SQE is located.

(6) The parameter sl indicates a service level, namely, a scheduling priority of the corresponding QP.

The network interface card of the transmit-end server may obtain a total length of the first SQE from the first instruction segment. The network interface card of the transmit-end server compares the total length of the first SQE with a preset threshold. If the total length of the first SQE is less than or equal to the preset threshold, the network interface card of the transmit-end server determines that the first instruction segment of the first SQE is data of a blueframe. If the total length of the first SQE is greater than the preset threshold, the network interface card of the transmit-end server may determine that the first instruction segment of the first SQE is a doorbell, and obtain the first SQE based on a non-blueframe method. For example, the network interface card of the transmit-end server obtains another instruction segment of the first SQE from a buffer using a direct memory access technology.

If determining that the $j^{th}$ instruction segment is data of a blueframe, the network interface card of the transmit-end server performs S404 and S402.

Further, if determining that the $j^{th}$ instruction segment is data of a blueframe, the network interface card of the transmit-end server may further perform S406 to S408.

S406: The network interface card of the transmit-end server obtains an identifier of a QP to which the first SQE belongs and an identifier of a location of the first SQE in the QP.

The network interface card of the transmit-end server may obtain, from the first instruction segment, the identifier of the QP to which the first SQE belongs and the identifier of the location of the first SQE in the QP. The identifier of the QP to which the first SQE belongs may be a value of the qp number, and the identifier of the location of the first SQE in the QP may be a value of sqe_index.

S407: The network interface card of the transmit-end server establishes a correspondence between an identifier of the first storage area, the identifier of the QP to which the first SQE belongs, and the identifier of the location of the first SQE in the QP.

For example, the network interface card of the transmit-end server may preconfigure a table described in S204, and the table is used to record an identifier of a storage area in a blueframe buffer and information related to a stored blueframe. For details, refer to the description in S204. Details are not described in this application.

S408: The network interface card of the transmit-end server determines whether the first SQE is completely received.

In a possible implementation, the network interface card of the transmit-end server may determine, by determining whether an accumulated value is equal to the total length of the first SQE, whether the first SQE is completely received. The accumulated value may be used to indicate a length of a received instruction segment of the first SQE. An initial value of the accumulated value may be 0. For example, the accumulated value may be increased by 8 bytes each time the network interface card of the transmit-end server receives an instruction segment. Alternatively, the accumulated value is increased by 1 each time the network interface card of the transmit-end server receives an instruction segment. For example, if the network interface card of the transmit-end server receives one instruction segment, the accumulated value is 8 bytes. If the network interface card of the transmit-end server receives two instruction segments, the accumulated value is 16 bytes, and so on. It should be noted that a RAM that implements the blueframe buffer may store the accumulated value. Certainly, the blueframe buffer may be implemented by another storage medium. This is not limited in this application.

If an updated accumulated value is equal to the total length of the first SQE, it is determined that the first SQE is completely received, and S409 is performed.

If the updated accumulated value is not equal to the total length of the first SQE, it is determined that the first SQE is not completely received, and the network interface card of the transmit-end server continues to receive a next PCIe packet, in other words, receive a next instruction segment of the first SQE. For example, the network interface card of the transmit-end server may further continue to receive an $(i+1)^{th}$ PCIe packet, where the $(i+1)^{th}$ PCIe packet includes a $k^{th}$ instruction segment of the first SQE and a second address segment, and the second address segment is used to indicate a segment location of the $k^{th}$ instruction segment in the first SQE, store, in a $k^{th}$ storage unit in the first storage area, the $k^{th}$ instruction segment. The $k^{th}$ instruction segment is any one of instruction segments other than an instruction segment, of the first SQE, received by the network interface card of the transmit-end server. For example, when i=1, and the first PCIe packet includes the first instruction segment of the first SQE, the $k^{th}$ instruction segment may be any one of the second instruction segment to the eighth instruction segment. When i=2, the first PCIe packet includes the second instruction segment of the first SQE, and the second PCIe packet includes a third instruction segment of the first SQE, the $k^{th}$ instruction segment may be any one of the first instruction segment and a fourth instruction segment to the eighth instruction segment. An instruction segment contained by each of n PCIe packets may be processed based on the data processing method provided in the embodiments of this application. Details are not described.

It should be noted that if the network interface card of the transmit-end server determines that the first SQE is not completely received, after receiving the other instruction segment, the network interface card of the transmit-end server needs to determine whether the first SQE is completely received; until the first SQE is completely received, the network interface card of the transmit-end server generates a terminator.

S409: The network interface card of the transmit-end server generates the terminator.

For example, the terminator can be an end-of-packet (eop), and the terminator may be used to separate different blueframes.

It should be noted that after the network interface card of the transmit-end server performs S404 and S402 when determining that the $j^{th}$ instruction segment is not the first instruction segment of the first SQE, in other words, j is not equal to 1, after receiving the first instruction segment, the network interface card of the transmit-end server may store, in a first storage unit in the first storage area, the first instruction segment, and perform S406 to S408.

In addition, when the network interface card of the transmit-end server determines that the currently received $i^{th}$ PCIe packet is not the first PCIe packet of the first SQE, in other words, i is not equal to 1, if j is equal to 1, in other words, the $i^{th}$ PCIe packet includes the first instruction segment, it may be understood that before the network interface card of the transmit-end server receives the first instruction segment, the network interface card of the transmit-end server receives an instruction segment other than the first instruction segment of the first SQE. The network interface card of the transmit-end server may further store, in the first storage unit in the first storage area, the first instruction segment, and perform S406 to S408.

It should be noted that an order of the steps of the data processing method provided in this application may be properly adjusted, and a step may be added or removed based on a situation. For example, an order of S403 and S405 may be changed. That is, the network interface card of the transmit-end server may first determine whether the $j^{th}$ instruction segment is data of a blueframe, and then determine whether the $j^{th}$ instruction segment is the first instruction segment of the first SQE. Any method that can be readily figured out by a person skilled in the art within the technical scope disclosed in this application shall fall within the protection scope of this application. Therefore, details are not described.

For example, the network interface card of the transmit-end server may determine, based on the first address segment, whether the $j^{th}$ instruction segment contained by the first PCIe packet is data of a blueframe. For example, the network interface card of the transmit-end server may include a plurality of registers, and the plurality of registers are configured to store different data. In this application, one or more registers in the plurality of registers contained by the network interface card of the transmit-end server may be used as a buffer area of the blueframe, in other words, the area is used to store the blueframe. An address of the buffer area of the blueframe may be an address of the register. After obtaining the first address segment, the network interface card of the transmit-end server may first determine whether the first address segment is an address in an address range of the register. If the first address segment is an address in the address range of the register, it may be determined that the $j^{th}$ instruction segment is data of a blueframe. The network interface card of the transmit-end server then determines whether all the lower 8 bits of the first address segment are 0. If all the lower 8 bits of the first address segment are 0, it may be determined that the $j^{th}$ instruction segment is the first instruction segment of the first SQE. If all the lower 8 bits of the first address segment are not 0, the $j^{th}$ instruction segment is not the first instruction segment of the first SQE, in other words, the $j^{th}$ instruction segment is any one of the second instruction segment to the eighth instruction segment of the first SQE. If the first address segment is not the address in the address range of the register, it may be determined that the $j^{th}$ instruction segment is not data of a blueframe.

In addition, after the first SQE is completely received and the first SQE is stored in the first storage area, S204 to S209 may be performed.

To understand the data processing method provided in the embodiments of this application, an example is provided herein for description.

Figure 5:
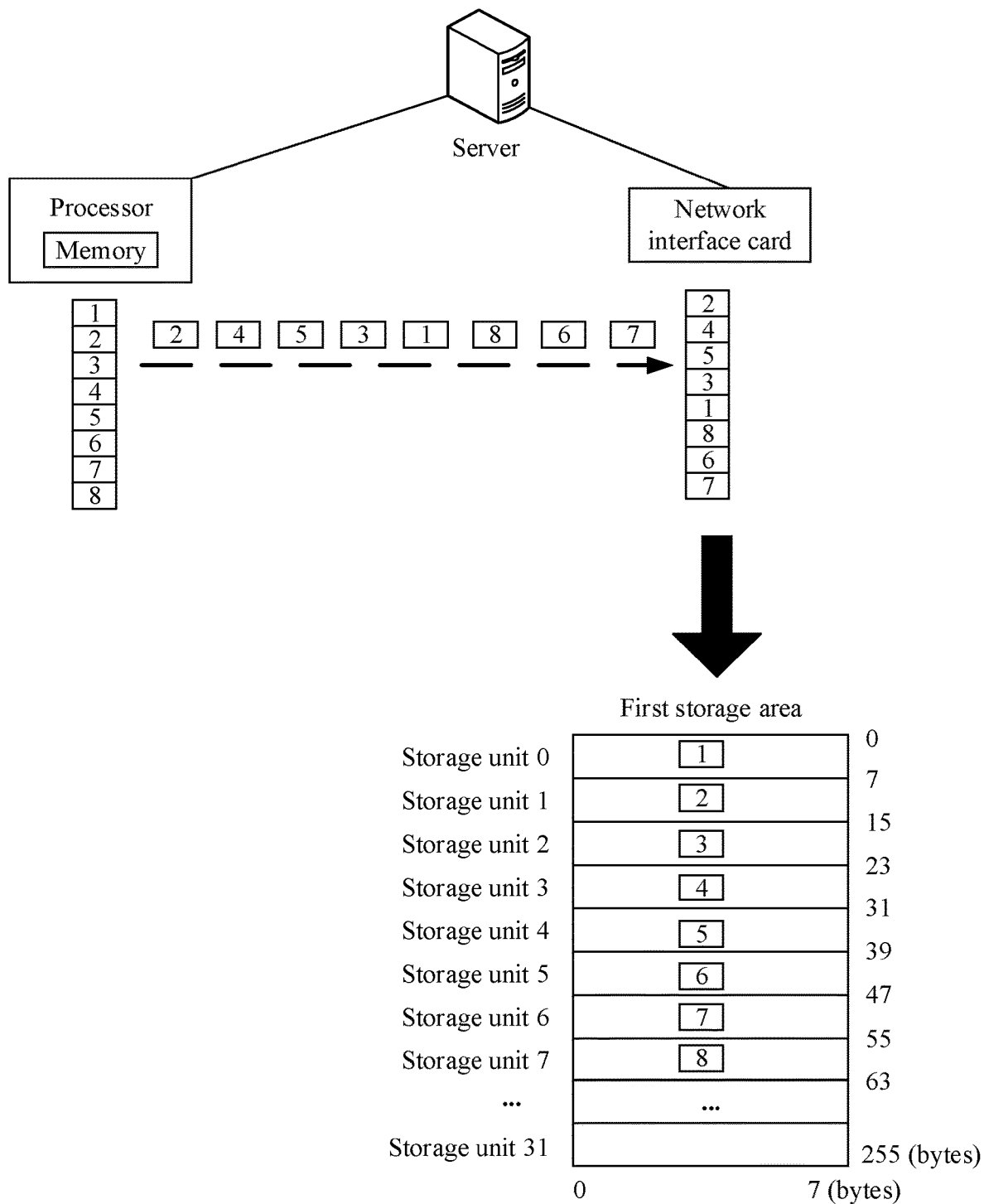
FIG. 5 is a flowchart of still another data processing method according to this application.

For example, as shown in FIG. 5, it is assumed that the processor of the transmit-end server sends eight instruction segments of a blueframe to the network interface card of the transmit-end server in an order of 2, 4, 5, 3, 1, 8, 6, and 7. That is, a first PCIe packet includes a second instruction segment, a second PCIe packet includes a fourth instruction segment, a third PCIe packet includes a fifth instruction segment, a fourth PCIe packet includes a third instruction segment, a fifth PCIe packet includes a first instruction segment, a sixth PCIe packet includes an eighth instruction segment, a seventh PCIe packet includes a sixth instruction segment, and an eighth PCIe packet includes a seventh instruction segment.

An order in which the network interface card of the transmit-end server receives the eight instruction segments of the blueframe that are sent by the processor of the transmit-end server is 2, 4, 5, 3, 1, 8, 6, and 7.

After receiving the first PCIe packet sent by the processor of the transmit-end server, the network interface card of the transmit-end server parses the first PCIe packet, to obtain the second instruction segment and a first address segment. The network interface card of the transmit-end server then may determine a second segment location of the second instruction segment in the blueframe based on the first address segment. Therefore, the network interface card of the transmit-end server may determine that the received second instruction segment is data of a blueframe, and then the network interface card of the transmit-end server stores, in a second storage unit in the first storage area, the second instruction segment. Similarly, after receiving the first instruction segment and the third instruction segment to the eighth instruction segment that are sent by the processor of the transmit-end server, the network interface card of the transmit-end server respectively stores the first instruction segment and the third instruction segment to the eighth instruction segment in a first storage unit and a third storage unit to an eighth storage unit in the first storage area.

In addition, the accumulated value is updated each time the network interface card of the transmit-end server receives an instruction segment. For example, the accumulated value may be increased by 8 bytes. Alternatively, the accumulated value is increased by 1 each time the network interface card of the transmit-end server receives an instruction segment. An initial value of the accumulated value may be 0.

It should be noted that after the network interface card of the transmit-end server receives the first instruction segment sent by the processor of the transmit-end server, the network interface card of the transmit-end server may further obtain an identifier of a QP to which the blueframe belongs and an identifier of a location of the blueframe in the QP. It is assumed that the identifier of the QP to which the blueframe belongs is qp2, and the identifier of the location of the blueframe in the QP is PI3. The network interface card of the transmit-end server establishes a correspondence between the first storage area, qp2, and PI3. In addition, the network interface card of the transmit-end server may further obtain a total length of the blueframe, and determine whether the updated accumulated value is equal to the total length of the blueframe. In this embodiment of this application, the blueframe includes eight instruction segments, and the total length of the blueframe is 64 bytes. Therefore, the updated accumulated value is less than the total length of the blueframe, and the network interface card of the transmit-end server continues to receive another instruction segment of the blueframe.

The foregoing mainly describes the solutions provided in the embodiments of this application from a perspective of the method. To implement the foregoing functions, corresponding hardware structures and/or software modules for implementing the functions are included. A person skilled in the art should be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a data processing apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, the module division may be other division.

The data processing method provided in this application is described in detail above with reference to FIG. 2 and FIG. 4. A data processing apparatus, a network interface card, and a server provided in this application are described below with reference to FIG. 6 to FIG. 8.

Figure 6:
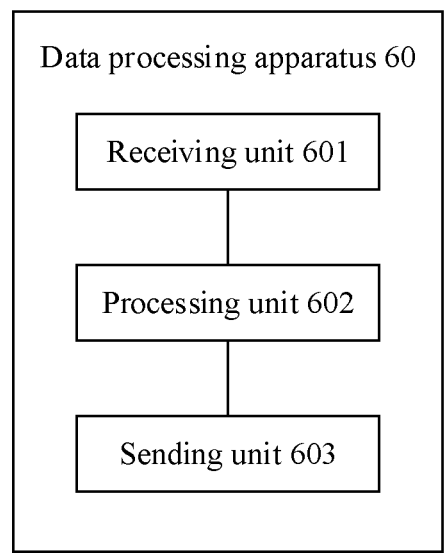
FIG. 6 is a schematic structural diagram of a data processing apparatus according to this application.

FIG. 6 is a schematic structural diagram of a data processing apparatus 60 according to an embodiment of this application. The apparatus 60 may be configured to perform the data processing method shown in either FIG. 2 or FIG. 4. The apparatus 60 may include a receiving unit 601 and a processing unit 602. The receiving unit 601 is configured to receive an $i^{th}$ PCIe packet. The $i^{th}$ PCIe packet includes a $j^{th}$ instruction segment of a first SQE and a first address segment. The processing unit 602 is configured to store, in a $j^{th}$ storage unit in a first storage area, the $j^{th}$ instruction segment. When all the n instruction segments of the first SQE are stored in the first storage area, the first SQE, an identifier of a queue pair QP to which the first SQE belongs, and an identifier of a location of the first SQE in the QP are obtained according to the instructions in n storage units in the first storage area, and data processing is performed based on the identifier of the QP to which the first SQE belongs and the identifier of the location of the first SQE in the QP. For example, with reference to FIG. 2, the processing unit 602 may be configured to perform S203 to S205. For another example, with reference to FIG. 4, the processing unit 602 may be configured to perform S401 to S409.

In this embodiment of this application, further, as shown in FIG. 6, the apparatus 60 may further include a sending unit 603.

The sending unit 603 is configured to send data, for example, is configured to support the data processing apparatus 60 in performing S206 in the method shown in FIG. 2.

It should be noted that all related content of the steps in the foregoing method embodiments can be cited in function description of the corresponding function modules. Details are not described herein.

The apparatus 60 provided in this embodiment of this application is configured to perform the method in any of the foregoing embodiments, and therefore can achieve same effects as the method in the foregoing embodiments.

It should be understood that the apparatus 60 in this embodiment of this application may be implemented using an ASIC or a programmable logic device (PLD). The PLD may be a complex programmable logic device (CPLD), a field-programmable gate array (FPGA), a generic array logic (GAL), or any combination thereof. The methods shown in FIG. 2 and FIG. 4 may be implemented using software, and the apparatus 60 and the modules of the apparatus 60 may be software modules.

For explanations of related content, description of beneficial effects, and the like in this embodiment, refer to the foregoing method embodiments.

Figure 7:
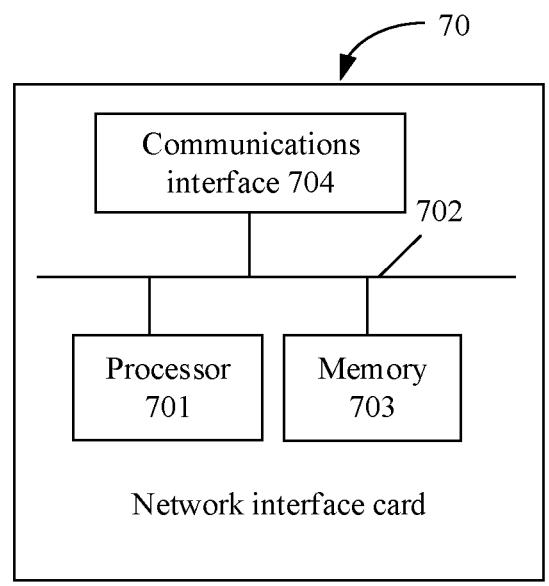
FIG. 7 is a schematic structural diagram of a network interface card according to this application.

FIG. 7 is a schematic structural diagram of hardware of a network interface card 70 according to an embodiment of this application. As shown in the figure, the network interface card 70 includes at least one processor 701, a communications line 702, a memory 703, and a communications interface 704. The communications line 702 may include a path for transmitting information between the at least one processor 701, the memory 702, and the communications interface 704. The communications interface 704 herein is configured to support the network interface card 70 in communicating with another device or component. The communications interface 704 may include a wired transceiver or a wireless transceiver. The wireless transceiver may include a communications chip. The at least one processor 701 and the communications chip may be integrated or may be independently disposed. The memory 703 is configured to store computer-executable instructions used to execute the solutions of this application, and the computer-executable instructions are executed under control of the processor 701. The processor 701 is configured to execute the computer-executable instructions stored in the memory 703, to implement the data processing method provided in the foregoing embodiments of this application. For explanations of related content, description of beneficial effects, and the like in this embodiment, refer to the foregoing method embodiments.

Figure 8:
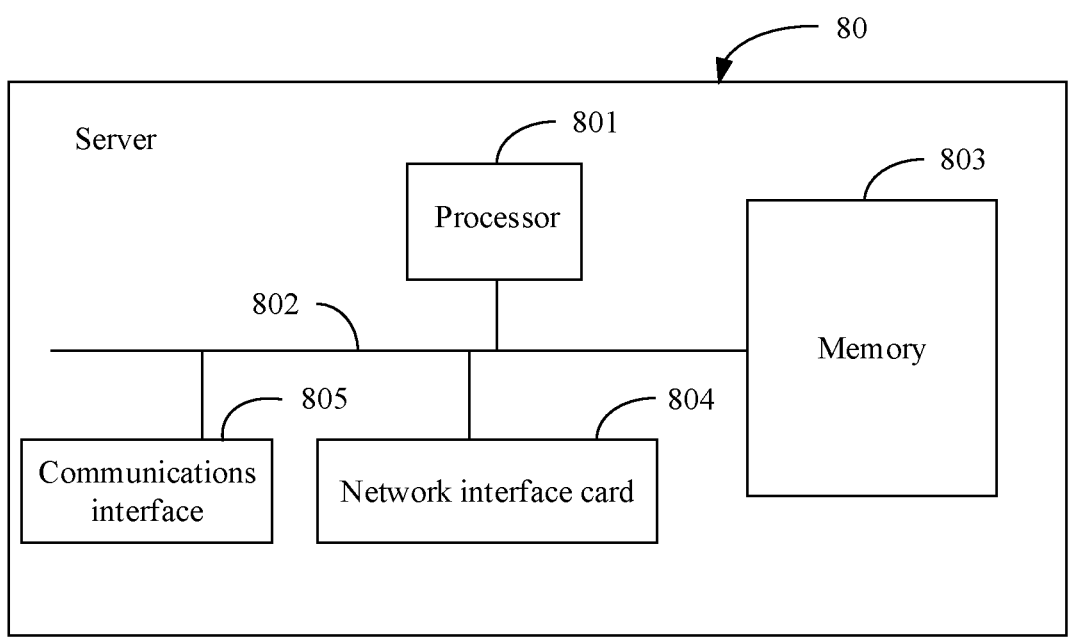
FIG. 8 is a schematic structural diagram of a server according to this application.

FIG. 8 is a schematic structural diagram of a server 80 according to an embodiment of this application. As shown in the figure, the server 80 includes at least one processor 801, a communications line 802, a memory 803, a network interface card 804, and a communications interface 805. The communications interface 805 may include a wired transceiver or a wireless transceiver. The wireless transceiver may include a communications chip. The at least one processor 801 and the communications chip may be integrated or may be independently disposed.

The processor 801 may be a general purpose CPU, or the processor 801 may be another general purpose processor, a DSP, an ASIC, an FPGA or another programmable logic device, a discrete gate or transistor logic device, a discrete hardware component, or the like. The general purpose processor may be a microprocessor, any conventional processor, or the like. Alternatively, the processor 801 may be a graphics processing unit (GPU), a neural network processing unit (NPU), a microprocessor, an ASIC, or one or more integrated circuits configured to control program execution in the solutions of this application.

The communications line 802 may include a path for transmitting information between the components (for example, the processor 801, the memory 803, the network interface card 804, and the communications interface 805).

The memory 803 may be a read-only memory (ROM) or another type of static storage device that can store static information and an instruction, a random-access memory (RAM) or another type of dynamic storage device that can store information and an instruction, an electrically erasable programmable read-only memory (EEPROM), a compact disc read-only memory (CD-ROM), other compact disc storage, optical disc storage (including a compressed optical disc, a laser disc, an optical disc, a digital versatile disc, a blue-ray optical disc, and the like), a magnetic disk storage medium or another magnetic storage device, or any other medium that can be configured to carry or store expected program code in a form of an instruction or a data structure and that can be accessed by a computer. However, this is not limited thereto. The memory 803 may exist independently, and is connected to the processor 801 using the communications line 802. Alternatively, the memory 803 may be integrated with the processor 802. The memory 803 provided in this embodiment of this application may usually be nonvolatile. The memory 803 is configured to store computer-executable instructions used to execute the solutions of this application, and the computer-executable instructions are executed under control of the processor 801. The processor 801 is configured to execute the computer-executable instructions stored in the memory 803, to implement the data processing method provided in the foregoing embodiments of this application.

For a structure of the network interface card 804, refer to FIG. 7. Details are not described herein.

The communications interface 805 may be an apparatus such as a transceiver, and is configured to support the server 80 in communicating with another device.

Optionally, the computer-executable instructions in this embodiment of this application may also be referred to as application program code.

In an example, the processor 801 may include one or more CPUs. In an example, the server 80 may include a plurality of processors. Each of these processors may be a single-core (single-CPU) processor, or may be a multi-core (multi-CPU) processor. The processor 801 herein may be one or more devices, circuits, and/or processing cores for processing data (for example, a computer program instruction).

The server 80 may be a general-purpose device or a dedicated device. For example, the server 80 may be an X86-based server or an ARM-based server, or may be another dedicated server such as a policy control and charging (PCC) server. A type of the server 80 is not limited in this embodiment of this application. ARM is short for advanced reduced instruction set computing machines, and RISC is short for reduced instruction set computer.

An embodiment of this application further provides a communications system. The communications system may include a server 80. The server 80 may serve as a transmit-end server. In addition, the communications system further includes a receive-end server configured to receive data sent by the transmit-end server, such that the receive-end server performs the foregoing data processing method.

All or some of the foregoing embodiments may be implemented using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a DSL) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely example implementations of this application. Any variation or replacement figured out by a person skilled in the art based on the example implementations provided in this application shall fall within the protection scope of this application.

What is claimed is:

1. A data processing method, comprising:
receiving, by a network interface card, an $i^{th}$ Peripheral Component Interconnect Express (PCIe) packet, wherein the $i^{th}$ PCIe packet comprises a $j^{th}$ instruction segment and a first address segment that are of a first send queue entry (SQE), wherein the first address segment indicates a segment location of the $j^{th}$ instruction segment in the first SQE, wherein i is an integer, wherein j is an integer, wherein the first SQE is divided into n instruction segments based on a preset size, and wherein n is an integer that is greater than or equal to 1;

storing, by the network interface card, the $j^{th}$ instruction segment into a $j^{th}$ storage unit in a first storage area, wherein the first storage area is in the network interface card and is configured to store the first SQE, wherein the first storage area comprises m storage units, wherein each storage unit carries a unique identifier, and wherein the unique identifier is associated with a ranking of each to-be-stored segment of an SQE;

obtaining, by the network interface card, according to instructions in n storage units in the first storage area and when all the n instruction segments of the first SQE are stored in the first storage area, the first SQE, an identifier of a queue pair (QP) to which the first SQE belongs, and a location identifier of the first SQE in the QP; and performing, by the network interface card, data processing based on the identifier of the QP and the location identifier of the first SQE in the QP.

2. The data processing method of claim 1, wherein when i=1, before storing the $j^{th}$ instruction segment, the data processing method further comprises determining, by the network interface card, whether the first address segment is in a range of storage space in which the first storage area is located.

3. The data processing method of claim 2, further comprising:

determining, by the network interface card, that the $j^{th}$ instruction segment is data of a blueframe when the first address segment is in the range of the storage space; and determining, by the network interface card, that the $j^{th}$ instruction segment is not data of a blueframe when the first address segment is not in the range of the storage space.

4. The data processing method of claim 1, wherein when j=1, after receiving the $i^{th}$ PCIe packet, the data processing method further comprises:

obtaining, by the network interface card, a total length of the first SQE from a first instruction segment, wherein the first instruction segment comprises the total length of the first SQE; and comparing, by the network interface card, the total length of the first SQE with a preset threshold.

5. The data processing method of claim 4, further comprising:

determining, by the network interface card, that the first instruction segment of the first SQE is data of a blueframe when the total length of the first SQE is less than or equal to the preset threshold; and determining, by the network interface card, that the first instruction segment of the first SQE is not data of a blueframe when the total length of the first SQE is greater than the preset threshold.

6. The data processing method of claim 4, wherein when the total length of the first SQE is less than or equal to the preset threshold, the data processing method further comprises:

obtaining, by the network interface card, the identifier of the QP and the location identifier of the first SQE, wherein the first instruction segment comprises the identifier of the QP and the location identifier of the first SQE; and establishing, by the network interface card, a correspondence between the identifier of the QP, the location identifier of the first SQE, and an identifier of the first storage area.

7. The data processing method of claim 6, wherein performing the data processing comprises:

determining, by the network interface card based on the identifier of the QP and the location identifier of the first SQE, the first storage area for storing the first SQE;

sequentially reading the n instruction segments of the first SQE by starting from a start address of the first storage area; and obtaining and sending, according to the n instruction segments of the first SQE, data corresponding to the first SQE.

8. The data processing method of claim 7, wherein determining the first storage area for storing the first SQE comprises determining the first storage area based on the correspondence.

9. A network interface card, comprising:

a memory configured to store instructions; and a processor coupled to the memory and configured to execute the instructions to cause the network interface card to:

receive an $i^{th}$ Peripheral Component Interconnect Express (PCIe) packet, wherein the $i^{th}$ PCIe packet comprises a $j^{th}$ instruction segment and a first address segment that are of a first send queue entry (SQE), wherein the first address segment indicates a segment location of the $j^{th}$ instruction segment in the first SQE, wherein i is an integer, wherein j is an integer, wherein the first SQE is divided into n instruction segments based on a preset size, and wherein n is an integer that is greater than or equal to 1;

store the $j^{th}$ instruction segment into a $j^{th}$ storage unit in a first storage area, wherein the first storage area is in the network interface card and is configured to store the first SQE, wherein the first storage area comprises m storage units, wherein each storage unit carries a unique identifier, and wherein the unique identifier is associated with a ranking of each to-be-stored segment of an SQE;

obtain, according to instructions in n storage units in the first storage area and when all the n instruction segments of the first SQE are stored in the first storage area, the first SQE, an identifier of a queue pair (QP) to which the first SQE belongs, and a location identifier of the first SQE in the QP; and perform data processing based on the identifier of the QP and the location identifier of the first SQE.

10. The network interface card of claim 9, wherein the processor is configured to execute the instructions to further cause the network interface card to:

determine, when i=1, whether the first address segment is in a range of storage space in which the first storage area is located;

determine that the $j^{th}$ instruction segment is data of a blueframe when the first address segment is in the range of the storage space; and determine that the $j^{th}$ instruction segment is not data of a blueframe when the first address segment is not in the range of the storage space.

11. The network interface card of claim 9, wherein the processor is configured to execute the instructions to further cause the network interface card to:

obtain a total length of the first SQE when j=1, wherein a first instruction segment comprises the total length of the first SQE; and compare the total length of the first SQE with a preset threshold.

12. The network interface card of claim 11, wherein the processor is configured to execute the instructions to further cause the network interface card to:

determine that the first instruction segment of the first SQE is data of a blueframe when the total length of the first SQE is less than or equal to the preset threshold; and determine that the first instruction segment of the first SQE is not data of a blueframe when the total length of the first SQE is greater than the preset threshold.

13. The network interface card of claim 11, wherein when the total length of the first SQE is less than or equal to the preset threshold, the processor is configured to execute the instructions to further cause the network interface card to:

obtain the identifier of the QP and the location identifier of the first SQE, wherein the first instruction segment comprises the identifier of the QP and the location identifier of the first SQE; and establish a correspondence between the identifier of the QP, the location identifier of the first SQE, and an identifier of the first storage area.

14. The network interface card of claim 13, wherein the processor is configured to execute the instructions to further cause the network interface card to:

determine, based on the identifier of the QP and the location identifier of the first SQE, the first storage area for storing the first SQE;

sequentially read the n instruction segments of the first SQE by starting from a start address of the first storage area; and obtain and send, according to the n instruction segments of the first SQE, data corresponding to the first SQE.

15. The network interface card of claim 14, wherein the processor is configured to execute the instructions to further cause the network interface card to determine, based on the correspondence, the first storage area for storing the first SQE.

16. A server, comprising:

a processor configured to:
divide a first send queue entry (SQE) into n instruction segments based on a preset size; and
send the n instruction segments of the first SQE;

a network interface card configured to receive the n instruction segments from the processor, wherein n is an integer greater than or equal to 1; and a memory configured to store the n instruction segments and computer-executable instructions, wherein the network interface card is configured to invoke the computer-executable instructions to process the n instruction segments of the first SQE so that when the network interface card runs, the server is configured to:

receive, via the network interface card, an $i^{th}$ Peripheral Component Interconnect Express (PCIe) packet, wherein the $i^{th}$ PCIe packet comprises a $j^{th}$ instruction segment and a first address segment that are of the first SQE, wherein the first address segment indicates a segment location of the $j^{th}$ instruction segment in the first SQE, wherein i is an integer, and wherein j is an integer;

store the $j^{th}$ instruction segment into a $j^{th}$ storage unit in a first storage area, wherein the first storage area is in the network interface card and is configured to store the first SQE, wherein the first storage area comprises m storage units, wherein each storage unit carries a unique identifier, and wherein the unique identifier is associated with a ranking of each to-be-stored segment of an SQE;

obtain, according to instructions in n storage units in the first storage area and when all the n instruction segments of the first SQE are stored in the first storage area, the first SQE, an identifier of a queue pair (QP) to which the first SQE belongs, and a location identifier of the first SQE in the QP; and perform data processing based on the identifier of the QP and the location identifier of the first SQE.

17. The server of claim 16, wherein the network interface card is configured to invoke the computer-executable instructions to process the n instruction segments of the first SQE, so that when the network interface card runs, the server is further configured to determine, when i=1, whether the first address segment is in a range of storage space in which the first storage area is located.

18. The server of claim 17, wherein the network interface card is configured to invoke the computer-executable instructions to process the n instruction segments of the first SQE, so that when the network interface card runs, the server is further configured to:

determine that the $j^{th}$ instruction segment is data of a blueframe when the first address segment is in the range of the storage space; and determine that the $j^{th}$ instruction segment is not data of a blueframe when the first address segment is not in the range of the storage space.

19. The server of claim 16, wherein the network interface card is configured to invoke the computer-executable instructions to process the n instruction segments of the first SQE, so that when the network interface card runs, the server is further configured to:

obtain a total length of the first SQE, wherein a first instruction segment comprises the total length of the first SQE; and compare the total length of the first SQE with a preset threshold.

20. The server of claim 19, wherein the network interface card is configured to invoke the computer-executable instructions to process the n instruction segments of the first SQE, so that when the network interface card runs, the server is further configured to:

determine that the first instruction segment of the first SQE is data of a blueframe when the total length of the first SQE is less than or equal to the preset threshold; and determine that the first instruction segment of the first SQE is not data of a blueframe when the total length of the first SQE is greater than the preset threshold.

* * * * *